US009367307B2

(12) United States Patent
Allen et al.

(10) Patent No.: US 9,367,307 B2
(45) Date of Patent: Jun. 14, 2016

(54) STAGED POINTS-TO ANALYSIS FOR LARGE CODE BASES

(71) Applicant: Oracle International Corporation, Redwood Shores, CA (US)

(72) Inventors: Nicholas Allen, Brisbane (AU); Bernhard F. Scholz, Sydney (AU); Padmanabhan Krishnan, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 64 days.

(21) Appl. No.: 14/515,372

(22) Filed: Oct. 15, 2014

(65) Prior Publication Data

US 2016/0110191 A1    Apr. 21, 2016

(51) Int. Cl.
*G06F 9/44* (2006.01)
*G06F 9/45* (2006.01)
*G06F 17/30* (2006.01)

(52) U.S. Cl.
CPC ........ *G06F 8/72* (2013.01); *G06F 8/315* (2013.01); *G06F 8/443* (2013.01); *G06F 17/30424* (2013.01)

(58) Field of Classification Search
None
See application file for complete search history.

(56) References Cited

U.S. PATENT DOCUMENTS

| | | | | |
|---|---|---|---|---|
| 6,077,313 A * | 6/2000 | Ruf | ...................... | G06F 8/433 717/155 |
| 2004/0205740 A1 * | 10/2004 | Lavery | .................. | G06F 8/4441 717/151 |
| 2012/0304158 A1 * | 11/2012 | Li | ...................... | G06F 11/3604 717/132 |
| 2013/0055207 A1 * | 2/2013 | Cui | ..................... | G06F 11/3608 717/125 |
| 2013/0091487 A1 * | 4/2013 | Chandra | ............... | G06F 21/563 717/106 |
| 2013/0191818 A1 * | 7/2013 | Lee | ......................... | G06F 8/434 717/156 |
| 2014/0156669 A1 * | 6/2014 | Bati | .................. | G06F 17/30336 707/741 |
| 2015/0143349 A1 * | 5/2015 | Wang | ..................... | G06F 8/434 717/156 |

OTHER PUBLICATIONS

Markus Mock, Dynamic Points-To Sets: A Comparison with Static Analyses and Potential Applications in Program Understanding and Optimization, Mar. 2001, Microsoft Research Redmond, WA 98052.*

Bjarne Steensgaard, Points-to Analysis in Almost Linear Time, 1995 Microsoft Research One Microsoft Way, Redmond,WA 98052, USA.*

* cited by examiner

*Primary Examiner* — Li B Zhen
*Assistant Examiner* — Mohammad Kabir
(74) *Attorney, Agent, or Firm* — Osha Liang LLP (57) ABSTRACT

A method, system, and computer-readable medium (CRM) for performing a staged points-to analysis of an object-oriented codebase, including obtaining the codebase and a points-to query, slicing the codebase to obtain a program slice, and performing a type analysis of the program slice to compute a type set. The method, system, and CRM include refining the program slice, after performing the type analysis, by resolving virtual dispatch sites based on the type set, and performing, after refining the program slice, a context-insensitive points-to analysis of the program slice to compute a first points-to set. The method, system, and CRM include re-refining the program slice, after performing the context-insensitive points-to analysis, by resolving the virtual dispatch sites based on the first points-to set, and performing, after re-refining the program slice, a context-sensitive points-to analysis of the program slice to compute a second points-to set, which is provided to a developer.

20 Claims, 6 Drawing Sheets

```
1   class SecurityApplication {
2       public static void main(String[ ] args) {
3           String result = setup (args);
4           System.out.println(result);
5           SecurityFactory uFactory = new UntrustedSecurityFactory();
6           SecurityFactory tFactory = new TrustedSecurityFactory();
7           SecurityObject uObject = uFactory.getSecurityObject();
8           SecurityObject tObject = tFactory.getSecurityObject();
9           doSecurity(uObject, tObject); }
10
11      private static void doSecurity(SecurityObject secObj1, SecurityObject secObj2) {
12          SecurityAction action1 = new SecurityAction();
13          SecurityAction action2 = new SecurityAction();
14          action1.object = secObj1;
15          action2.object = secObj2;
16          Object res1 = action1.invoke();
17          Object res2 = action2.invoke();
18          doOtherThings(res1, res2); }
19
20      private static String setup(String[ ] args) { ... }
21      private static void doOtherThings(Object result1, Object result2) { ... } }
22
23  interface SecurityFactory {
24      public SecurityObject getSecurityObject(); }
25
26  class UntrustedSecurityFactory implements SecurityFactory {
27      public SecurityObject getSecurityObject() {
28          SecurityObject newUObj = new UntrustedSecurityObject();
29          return newUObj; } }
30
31  class TrustedSecurityFactory implements SecurityFactory {
32      public SecurityObject getSecurityObject() {
33          SecurityObject newTObj = new TrustedSecurityObject();
34          return newTObj; } }
35
36  class SecurityAction {
37      public SecurityObject object;
38      public Object invoke() {
39          SecurityObject storedObject = this.object;
40          return invoke0(storedObject); }
41      private static native Object invoke0(SecurityObject obj); }
42
43  class SecurityObject { ... }
44  class UntrustedSecurityObject extends SecurityObject { ... }
45  class TrustedSecurityObject extends SecurityObject { ... }
```

*FIG. 3A*

```
1    class SecurityApplication {
2        public static void main() {
3            SecurityFactory uFactory = new UntrustedSecurityFactory();
4            SecurityFactory tFactory = new TrustedSecurityFactory();
5            SecurityObject uObject = uFactory.getSecurityObject();
6            SecurityObject tObject = tFactory.getSecurityObject();
7            doSecurity(uObject, tObject); }
8
9        private static void doSecurity(SecurityObject secObj1, SecurityObject secObj2) {
10           SecurityAction action1 = new SecurityAction();
11           SecurityAction action2 = new SecurityAction();
12           action1.object = secObj1;
13           action2.object = secObj2;
14           action1.invoke();
15           action2.invoke(); } }
16
17   interface SecurityFactory {
18       public SecurityObject getSecurityObject(); }
19
20   class UntrustedSecurityFactory implements SecurityFactory {
21       public SecurityObject getSecurityObject() {
22           SecurityObject newUObj = new UntrustedSecurityObject();
23           return newUObj; } }
24
25   class TrustedSecurityFactory implements SecurityFactory {
26       public SecurityObject getSecurityObject() {
27           SecurityObject newTObj = new TrustedSecurityObject();
28           return newTObj; } }
29
30   class SecurityAction {
31       public SecurityObject object;
32       public Object invoke() {
33           SecurityObject storedObject = this.object;
34           return invoke0(storedObject); }
35       private static native Object invoke0(SecurityObject obj); }
36
37   class SecurityObject { ... }
38   class UntrustedSecurityObject extends SecurityObject { ... }
39   class TrustedSecurityObject extends SecurityObject { ... }
```

*FIG. 3B*

```
1    class SecurityApplication {
2        public static void main() {
3            SecurityFactory uFactory = new UntrustedSecurityFactory();
4            SecurityObject uObject = uFactory.getSecurityObject();
5            doSecurity(uObject); }
6
7        private static void doSecurity(SecurityObject secObj1) {
8            SecurityAction action1 = new SecurityAction();
9            action1.object = secObj1;
10           action1.invoke(); } }
11
12   interface SecurityFactory {
13       public SecurityObject getSecurityObject(); }
14
15   class UntrustedSecurityFactory implements SecurityFactory {
16       public SecurityObject getSecurityObject() {
17           SecurityObject newUObj = new UntrustedSecurityObject();
18           return newUObj; } }
19
20   class SecurityAction {
21       public SecurityObject object;
22       public Object invoke() {
23           SecurityObject storedObject = this.object;
24           return invoke0(storedObject); }
25       private static native Object invoke0(SecurityObject obj); }
26
27   class SecurityObject { ... }
28   class UntrustedSecurityObject extends SecurityObject { ... }
```

*FIG. 3C*

FIG. 4

STAGED POINTS-TO ANALYSIS FOR LARGE CODE BASES

BACKGROUND

Static program analyses for object-oriented programming languages largely rely on the precision of heap abstractions computed via points-to analyses, for which there exist a variety of different approaches. Standard context-insensitive points-to algorithms have insufficient precision for many applications including, for example, security analysis. In contrast, context-sensitive points-to algorithms may yield more precise points-to results, but for large-scale software such algorithms are computationally expensive and, historically, do not scale.

SUMMARY

In general, in one aspect, the invention relates to a method for performing a staged points-to analysis of a codebase written in an object-oriented programming language, including obtaining the codebase and a points-to query including query variables in the codebase, slicing the codebase based on the points-to query and slice rules to obtain a program slice, and performing a type analysis of the program slice based on type rules to compute a type set. The method further includes refining the program slice, after performing the type analysis, by resolving virtual dispatch sites based on the type set. The method further includes performing, after refining the program slice and based on points-to rules, a context-insensitive and field-sensitive points-to analysis of the program slice to compute a first points-to set. The method also includes re-refining the program slice, after performing the context-insensitive points-to analysis, by resolving the virtual dispatch sites based on the first points-to set. The method further includes performing, after re-refining the program slice and based on points-to rules, a context-sensitive points-to analysis of the program slice to compute a second points-to set, which is provided to a developer.

In general, in one aspect, the invention relates to a computer-readable medium including instructions for performing a staged points-to analysis of a codebase written in an object-oriented programming language, including obtaining the codebase and a points-to query including query variables in the codebase, slicing the codebase based on the points-to query and slice rules to obtain a program slice, and performing a type analysis of the program slice based on type rules to compute a type set. The computer-readable medium further includes instructions for refining the program slice, after performing the type analysis, by resolving virtual dispatch sites based on the type set. The computer-readable medium further includes instructions for performing, after refining the program slice and based on points-to rules, a context-insensitive and field-sensitive points-to analysis of the program slice to compute a first points-to set. The computer-readable medium further includes instructions for re-refining the program slice, after performing the context-insensitive points-to analysis, by resolving the virtual dispatch sites based on the first points-to set. The computer-readable medium further includes instructions for performing, after re-refining the program slice and based on points-to rules, a context-sensitive points-to analysis of the program slice to compute a second points-to set, which is provided to a developer.

In general, in one aspect, the invention relates to a system for performing a staged points-to analysis of a codebase written in an object-oriented programming language, including an analysis repository storing the codebase, slice rules, type rules, points-to rules, and a points-to query including query variables in the codebase. The system further includes a processor and a staged analysis platform executing on the processor including a slicing module, a type analysis engine, and a points-to analysis engine. The slicing module is configured to slice the codebase based on the points-to query and the slice rules to obtain a program slice. The slicing module is further configured to refine the program slice, after a type analysis of the program slice is performed, by resolving virtual dispatch sites based on a type set. The slicing module is also configured to re-refine the program slice, after a context-insensitive and field-sensitive points-to analysis is performed, by resolving the virtual dispatch sites based on a first points-to set. The type analysis engine is configured to perform the type analysis of the program slice based on the type rules to compute the type set. The points-to analysis engine is configured to perform, after the program slice is refined and based on the points-to rules, the context-insensitive points-to analysis of the program slice to compute the first points-to set. The points-to analysis engine is further configured to perform, after the program slice is re-refined and based on the points-to rules, a context-sensitive points-to analysis of the program slice to compute a second points-to set, which is provided to a developer.

Other aspects of the invention will be apparent from the following description and the appended claims.

BRIEF DESCRIPTION OF DRAWINGS

FIGS. 3A, 3B, and 3C show an example in accordance with one or more embodiments of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method, system, and computer readable medium for producing high-precision context-sensitive points-to results for a large scale object-oriented program (OOP) such as the Java Development Kit (MK). The points-to results are produced, in part, using a pre-analysis technique that combines a demand-driven (i.e., client-based) approach with program slicing and compaction that scales to large OOPs. The pre-analysis technique is performed in conjunction with type analysis and points-to analysis to produce the points-to results.

Specifically, according to one or more embodiments of the invention, a codebase is obtained along with a points-to query that includes program conditions for which the client (e.g., a developer) requires high-precision points-to results. The points-to query provides a basis for slicing the codebase using syntactic information. The resulting program slice is compacted by removing methods and/or variables that do not affect computation of the points-to set. A type analysis is performed on the program slice to compute a type set for variables included in the points-to query. The program slice is refined by using the type set to compute a more precise call-graph from the slice, enabling further pruning of non-contributing code. A context-insensitive points-to analysis is performed on the program slice in order to compute points-to information for the variable set. The points-to information, which is field-sensitive as a result of the analyses, is used to obtain a final slice by resolving the virtual dispatch of call-sites and removing remaining unnecessary methods and heap objects. A context-sensitive analysis is performed on the final slice to compute a final points-to set that is used to respond to the points-to query.

Figure 1:
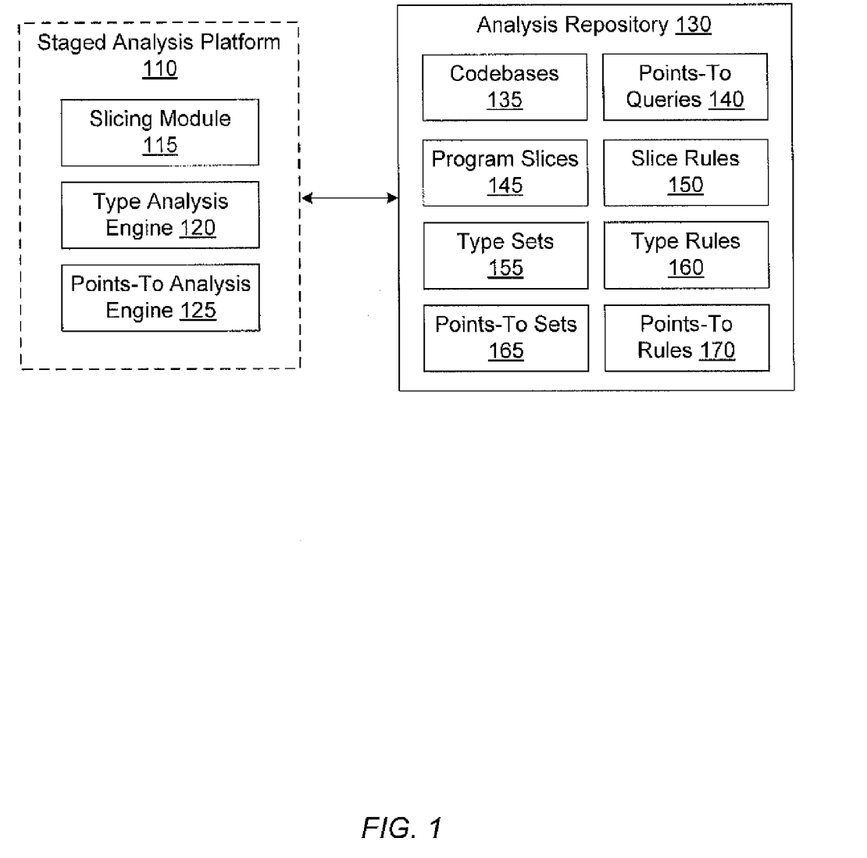
FIG. 1 shows a schematic in accordance with one or more embodiments of the invention.

FIG. 1 shows a schematic of a system for performing a staged points-to analysis, in accordance with one or more embodiments of the invention. As shown in FIG. 1, the system includes an analysis repository (130) and a staged analysis platform (110) including a slicing module (115), a type analysis engine (120), and a points-to analysis engine (125). Each of these components is described below.

In one or more embodiments of the invention, the analysis repository (130) is any type of storage unit and/or device (e.g., a file system, database, collection of tables, or any other storage mechanism) for storing data. Further, the analysis repository (130) may include multiple different storage units and/or devices. The multiple different storage units and/or devices may or may not be of the same type or located at the same physical site.

In one or more embodiments of the invention, the analysis repository (130) stores any or all of the following: codebases (135), points-to queries (140), program slices (145), slice rules (150), type sets (155), type rules (160), points-to sets (165), and points-to rules (170). Each of these is described below.

In one or more embodiments of the invention, codebases (135) are collections of source code used to build software applications or components. In other words, a codebase is a collection of computer instructions written in a human-readable programming language. A codebase may be transformed by a compiler program into binary machine code. Compiled machine code may then be executed by a processor in order to run the application generated from the codebase.

In one or more embodiments of the invention, a points-to query (140) is a set of program conditions, corresponding to a particular codebase (135), for which analysis is to be performed. A points-to query includes one or more query variables that are directly involved in the program conditions to be analyzed. For example, a points-to query might include whether, when a particular method in the codebase is invoked, an individual parameter of the method (i.e., the query variable) can point to an object of a specific class or type.

In one or more embodiments of the invention, a program slice (145) is a set of program statements extracted from a codebase (135) that potentially contribute to the points-to query (140). The program slice (145) may be a multi-set containing variables, field types, and methods. The program slice may be a contiguous or non-contiguous subset of the codebase, and the program slice may be executable or non-executable. In one or more embodiments of the invention, when a program slice (145) is computed, the program slice excludes all code from the codebase (135) that has been determined at that point as having no potential to affect the values of the query variable(s), either directly or indirectly.

In one or more embodiments of the invention, slice rules (150) are conditions used to determine the program statements in a codebase (135) that should be included in the program slice (145) and/or the program statements in the codebase that should be excluded from the program slice. In one or more embodiments of the invention, slice rules may be expressed in an "if-then" format. For example, a slice rule may provide that, if there is an assignment statement in the codebase having the form "x:=y", and variable x is already included in the program slice, then variable y is added to the program slice.

In one or more embodiments of the invention, a type set (155) is a set of possible types (e.g., classes) of objects that may be referenced by a variable set for which the type set is computed via a type analysis (discussed in further detail below). In other words, a type set computed for a particular variable set subsumes individual type sets for each variable in the variable set, each identifying possible types of objects that may be referenced by the corresponding variable. In one or more embodiments of the invention, the type set includes type information for the query variables specified by the points-to query (140) and contained in the codebase (135).

In one or more embodiments of the invention, type rules (160) are conditions used in a type analysis to compute the type set for one or more variables contained in a program slice (145). In one or more embodiments of the invention, type rules may be expressed in an "if-then" format. For example, a type rule may provide that, if there is an assignment statement in the program slice having the form "x:=y", then the type set for variable y is a subset of the type set for variable x. Based on this rule, once the type set for variable x is determined, the type set for variable y may also be determined.

In one or more embodiments of the invention, a points-to set (165) is a set of possible object-creation sites (i.e., program statements that declare, instantiate, and/or initialize objects) for objects that may be referenced by a variable set for which the points-to set is computed via a points-to analysis (discussed in further detail below). In other words, a points-to set computed for a particular variable set subsumes individual points-to sets for each variable in the variable set, each identifying possible object-creation sites for objects that may be referenced by the corresponding variable. In one or more embodiments of the invention, the points-to set includes points-to information for the query variables specified by the points-to query (140) and contained in the codebase (135).

In one or more embodiments of the invention, points-to rules (170) are conditions used in a points-to analysis to compute the points-to set for one or more variables contained in a program slice (145). In one or more embodiments of the invention, points-to rules may be expressed in an "if-then" format. For example, a points-to rule may provide that, if there is an assignment statement in the program slice having the form "x:=y", then the points-to set for variable y is a subset of the points-to set for variable x. Based on this rule, once the points-to set for variable x is determined, the points-to set for variable y may also be determined.

In one or more embodiments of the invention, the staged analysis platform (110) and/or components thereof (e.g., slicing module (115), type analysis engine (120), and points-to analysis engine (125)) are operatively connected to the analysis repository (130). In one or more embodiments of the invention, the staged analysis platform includes functionality to perform a demand-driven, staged points-to analysis of a codebase (135) based on a points-to query (140). In one or more embodiments of the invention, staged analysis platform includes functionality to obtain a codebase and/or a points-to query from a client (e.g., a developer). In one or more embodiments of the invention, the staged analysis platform includes functionality to provide a points-to set and/or other results of a staged points-to analysis of the codebase to a client.

In one or more embodiments of the invention, the slicing module (115) includes functionality to compute a program slice (145) from a codebase (135) (i.e., to "slice" the codebase). In one or more embodiments of the invention, the program slice is computed using syntax information only. The slicing module may slice the codebase based on one or more slice rules (150) and one or more query variables provided by a points-to query (140). The slice rules may be obtained from the analysis repository (130) or may be internal to the slicing module (115).

In one or more embodiments of the invention, the slicing module (115) includes functionality to compute a program slice (145) subtractively (i.e., by removing code from the codebase) and/or additively. In the latter case, according to one or more embodiments of the invention, the slicing module initializes the program slice to include the query variables and any methods containing the query variables. After the program slice is initialized, the slicing module may apply the slice rules (150) to extend the program slice to include additional variables, field types, and/or methods of the codebase (135). For example, a slice rule may be used to extend the program slice to include types and constructor methods of objects created by methods that are already included in the program slice. The slicing module may store a program slice in the analysis repository (130) for use by another component of the staged analysis platform (110), or may pass the program slice directly to the other component(s).

In one or more embodiments of the invention, the slicing module (115) includes functionality to compact a program slice (145) by pruning (i.e., removing) code related to non-contributing variables (e.g., variables that do not contribute directly or indirectly to the points-to query (140)) and/or variables that only store intermediate results. In one or more embodiments of the invention, the slicing module employs copy propagation, redundant code (including dead code, unreachable code, etc.) elimination techniques, and/or equivalent code factoring to compact a program slice.

In one or more embodiments of the invention, the slicing module (115) identifies removable code, at least in part, by building a value flow graph including the query variables, formal and actual arguments, return statements, object-creation sites, and/or receiver objects of method invocations at call sites. As part of the compaction process, the value flow graph may be utilized to compute equivalence classes between variables in order to eliminate redundancy.

In one or more embodiments of the invention, the type analysis engine (120) includes functionality to perform a type analysis of a program slice (145) in order to compute a type set (155) for query variables and/or other variables contained in the program slice. The type analysis engine may perform the type analysis based on one or more type rules (160) that are configured to propagate types from object-creation sites. The type rules may be stored in the analysis repository (130) or may be internal to the type analysis engine.

In one or more embodiments of the invention, the type analysis engine (120) includes functionality to compute the type set (155) by determining the smallest set of variable types for each variable included in the type analysis, such that the type rules (160) are maintained. The type analysis engine may store the resulting type set in the analysis repository (130) for use by another component of the staged analysis platform (110), or the type analysis engine may pass the type set directly to the other component(s). In one or more embodiments of the invention, the type analysis is context-insensitive, meaning that calling context is not considered when analyzing the target of a method call. Context sensitivity is discussed in further detail below.

Returning to the slicing module (115), in one or more embodiments of the invention, the slicing module includes functionality to refine a program slice (145) based on a type set (155) computed by the type analysis engine (120). In one or more embodiments of the invention, the slicing module includes functionality to enrich the slice rules (150) used in the slicing process with type information provided by the type set, and apply the enriched slice rules in order to further remove non-contributing code from the program slice. In one or more embodiments of the invention, the slicing module includes functionality to refine a program slice (145) based on a points-to set (165) computed by the points-to analysis engine (125).

In one or more embodiments of the invention, the points-to analysis engine (125) includes functionality to perform a points-to analysis of a program slice (145) in order to compute the points-to set (165) for query variables and/or other variables contained in the program slice. The points-to analysis engine may perform the points-to analysis based on one or more points-to rules (170). The points-to rules may be stored in the analysis repository (130) or may be internal to the points-to analysis engine.

In one or more embodiments of the invention, the points-to analysis engine (125) includes functionality to compute the points-to set (165) by determining the smallest set of object-creation sites for each variable included in the points-to analysis, such that the points-to rules (160) are maintained. The points-to analysis engine may store the resulting points-to set in the analysis repository (130) for use by another component of the staged analysis platform (110), or the points-to analysis engine may pass the points-to set directly to the other component(s). In one or more embodiments of the invention, the points-to analysis engine performs a context-insensitive points-to analysis and/or a context-sensitive points-to analysis. Context sensitivity is discussed in further detail below.

While FIG. 1 shows a configuration of components, other configurations may be used without departing from the scope of the invention. For example, various components may be combined to create a single component. As another example, the functionality performed by a single component may be performed by two or more components.

Figure 2:
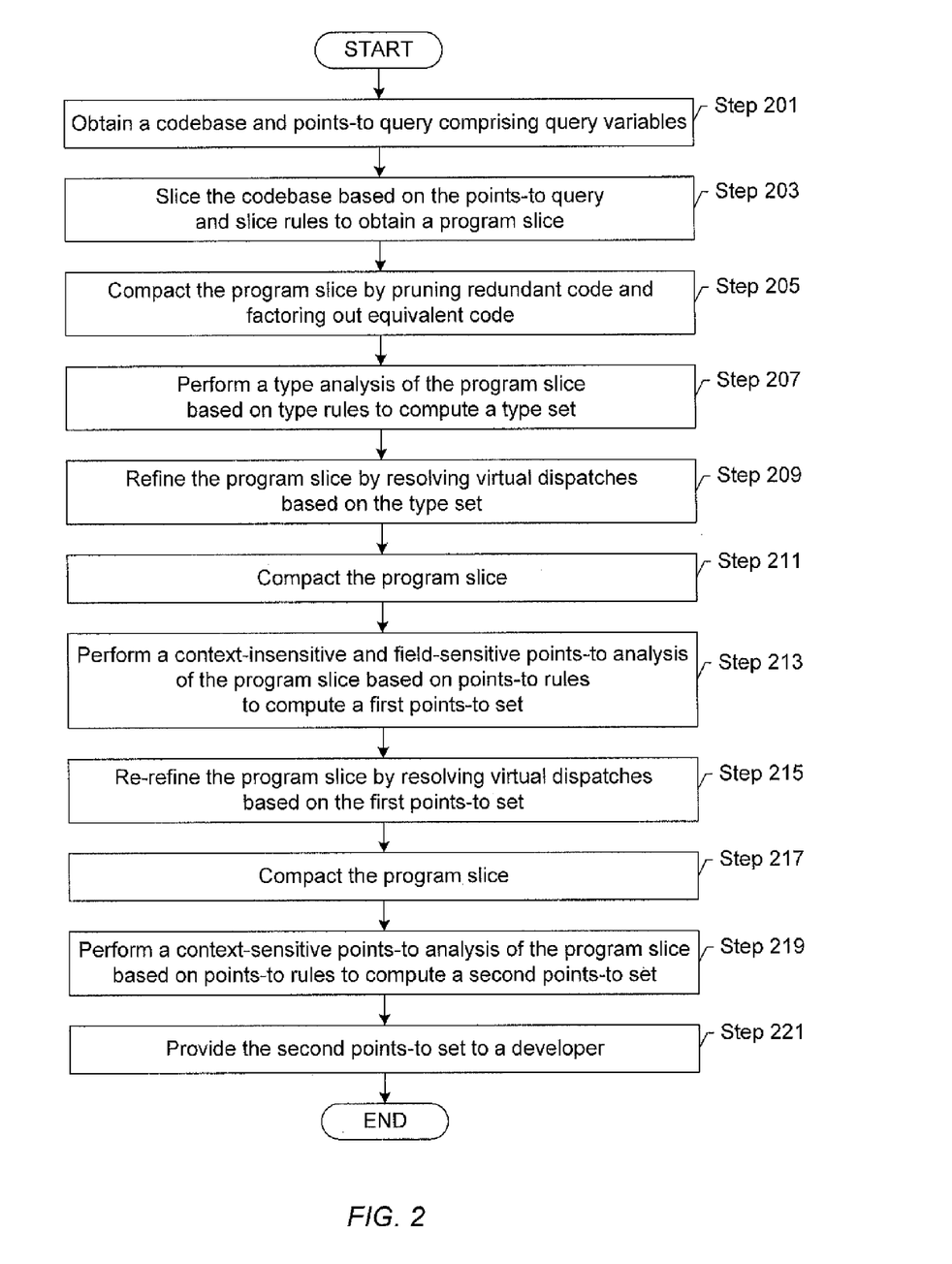
FIG. 2 shows a flowchart in accordance with one or more embodiments of the invention.

FIG. 2 shows a flowchart of a method for performing a staged points-to analysis, in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

In Step 201, a codebase and a points-to query including multiple query variables are obtained. The codebase and points-to query may be obtained from a client (e.g., a developer) or may be obtained from the analysis repository.

In Step 203, the codebase is sliced, based on the points-to query and slice rules, in order to obtain a program slice. The program slice may be computed by tracing the dataflow of the query variables backwards by the assignment relation. Initially, the slice may contain the query variables and the methods where the variables reside. The slice may be extended based on the slice rules. In one or more embodiments of the invention, the slice rules may be used to include the following information in the program slice: types and the constructor methods of objects that are created; the source of an assignment, if the destination of the assignment is already in the slice; assignment casts; and, the source of a load operation, if the result of the load operation is already in the slice. The slice may also be extended based on additional rules.

In Step 205, the program slice is compacted by pruning redundant code and factoring out equivalent code. The compaction may depend on the computation of equivalence classes via the assignment relation, which builds a value flow graph involving the query variables, formal and actual arguments, return statements, object creation sites, and receiver objects of method invocations at call sites. If multiple variables are determined as falling in the same equivalence class, one or more of the equivalent variables may be pruned or factored out from the program slice.

In Step 207, a type analysis is performed using the program slice, based on type rules, in order to compute a type set. The type analysis is context-insensitive, meaning that calling context is not considered when analyzing the target of a method call. In other words, using context information, a context-sensitive analysis may "jump back" to the original call site, whereas without context information, a context-insensitive analysis must be propagated back to all possible call sites. The type sets computed for the query variables may be used to refine the program slice, as discussed further below.

In Step 209, the program slice is refined by resolving virtual dispatches based on the type set computed in Step 207. In one or more embodiments of the invention, the slicing module reuses one or more slice rules and enriches one or more slice rules with the type set computed by the type analysis. The compatibility between a call-site and a method may be established by the object types that are referred to by the instance variable(s) at the call-site. Accordingly, the slice is refined by utilizing the type information for call-sites to resolve virtual method dispatches. In other words, based on the type set, one or more potential targets of a virtual method call may be eliminated from the slice if the formal parameters of the method are incompatible with the type set of actual parameters used at the call-site.

In Step 211, the program slice is compacted a second time. The second compaction may further reduce the size of the program slice in view of the type information previously obtained.

In Step 213, a context-insensitive and field-sensitive points-to analysis is performed using the program slice, based on points-to rules, in order to compute a first points-to set. The points-to analysis may build a heap abstraction to analyze object fields and obtain more precise information for resolving virtual dispatches. For each instance variable, a set of object-creation sites may be computed, and for each field of an object-creation site, a set of object-creation sites that the field can point to may be computed.

In Step 215, the program slice is re-refined by further resolving virtual dispatches based on the first points-to set computed in Step 213. The program slice produced by the refinement may include variables, methods, heap allocation sites, and points-to information for the points-to query. The slice rules may be more specific than those previously used in view of the newly obtained information including actual object-creation sites for each variables as well as field-sensitivity. In one or more embodiments of the invention, the slice rules may be used to include the following information in the program slice: all facts that are relevant to the query; all constituent elements of the points-to and field-points-to relation in the slice; the source of an assignment, if it points-to an object already in the slice; and, points-to facts related to a load operation, if the variable holding the result of the load operation is already in the slice. The slice may also be computed to include other code based on additional rules.

In Step 217, the program slice is compacted a third time. The third compaction may further reduce the size of the program slice in view of the points-to information previously obtained.

In Step 219, a context-sensitive points-to analysis is performed using the program slice, based on points-to rules, in order to compute a second points-to set. The context-sensitive analysis may further refine the call-graph, by determining whether a method is reachable in a given context, to compute the second points-to set. The analysis, being context-sensitive, is interprocedural in that the calling context is considered when analyzing the target of a method call. The context used for a given method may be based on the method's receiver object and the object that allocates the receiver object. As the resolution of the virtual method being invoked will depend on the type of receiver object, certain methods may prove unreachable in certain contexts, and these methods may be removed from the points-to set.

In Step 221, the second points-to set computed in Step 219 is provided to a developer in response to the points-to query. After Step 221 is performed, the process proceeds to end.

Figure 3B:
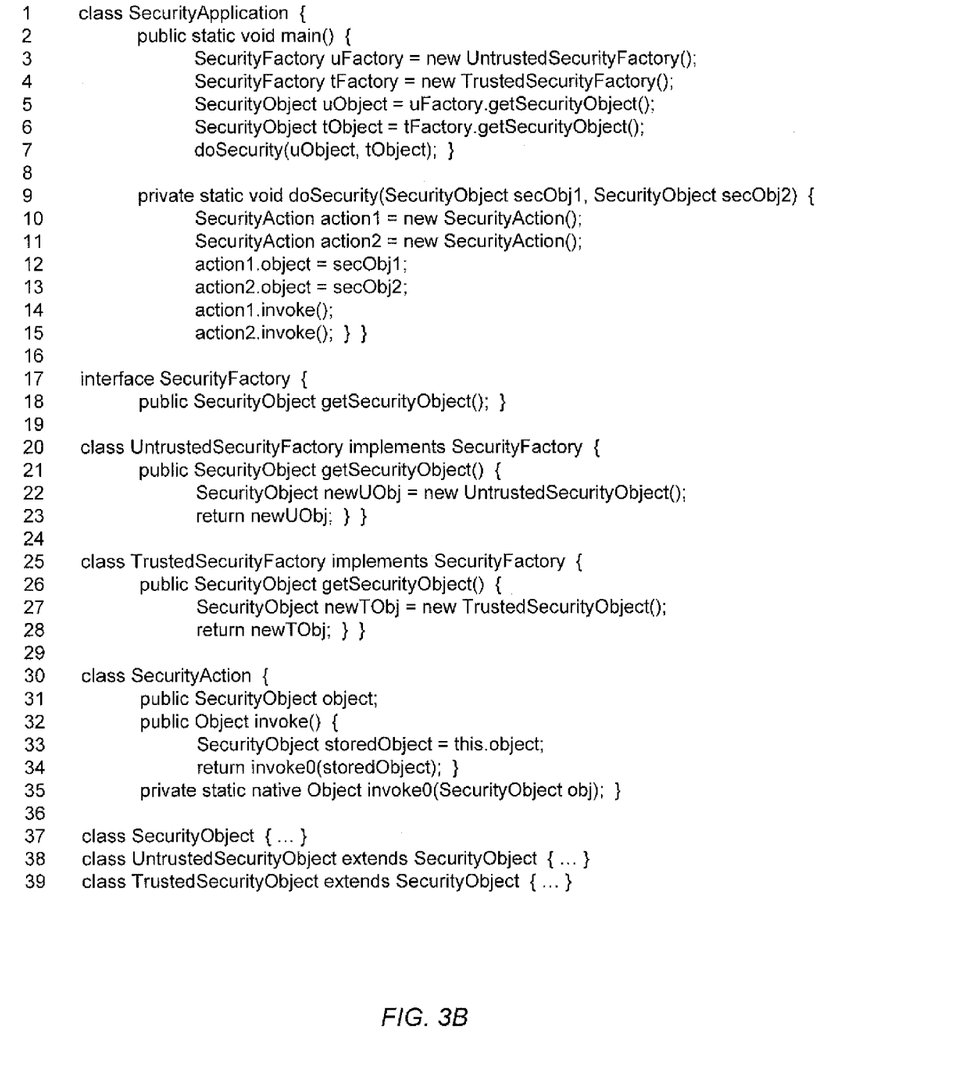
Figure 3C:
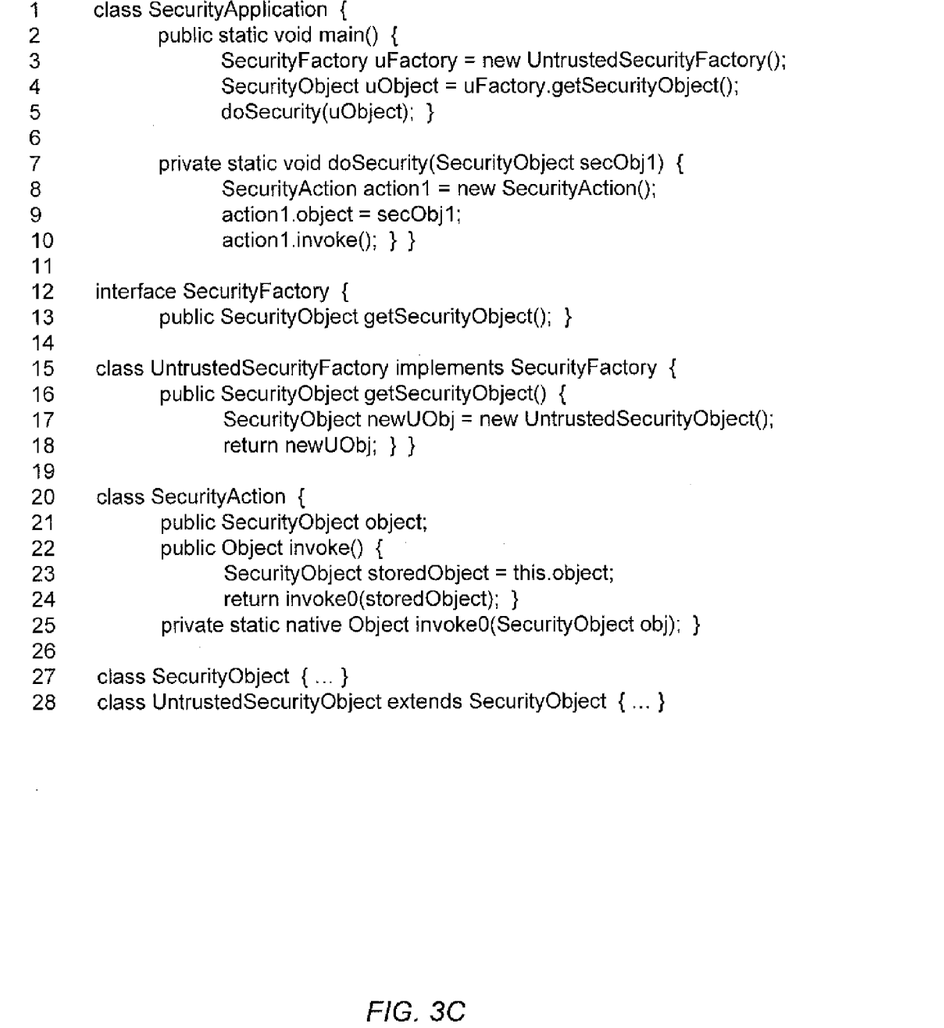

FIGS. 3A, 3B, and 3C show a worked example in accordance with one or more embodiments of the invention. The following example is for explanatory purposes only and not intended to limit the scope of the invention.

Suppose that a client developer has provided the codebase shown in FIG. 3A along with a points-to query inquiring whether, at the invocation of method invoke0 (occurring at line 40), the parameter storedObject points to an untrusted heap object of type UntrustedSecurityObject. It can be seen by reviewing the codebase that two types of security objects are used in the program, but the client's query is only interested in the use of untrusted objects in a secure context. Thus, non-security-related actions and trusted objects will be removed by the following analysis, which shows the effect of syntactic based and context-insensitive based slicing, compaction, and refinement.

The codebase is passed to the slicing module. By parsing the codebase syntactically, based on the points-to query, the slicing module determines that the only allocation of an untrusted object occurs at line 28. The slicing module further determines that variables including args, result, res1, res2, and methods including setup and doOtherThings do not contribute the desired points-to results, as they are unconnected to any statements involving untrusted objects. Accordingly, the slicing module computes a program slice from the codebase that eliminates the above-mentioned methods and variables. The resulting program slice is shown in FIG. 2.

The program slice is compacted by the slicing module to remove redundant code and factor out equivalent code. After compaction, the program slice is passed to the type analysis engine, which performs a type analysis on the program slice to obtain a type set for variables including storedObject. The program slice is then refined by the slicing module using the results of the type analysis.

The program slice is then passed to the points-to analysis engine, which performs a context-insensitive points-to analysis to determine if the variable storedObject at line 34 can potentially point to the new object created at line 22. The variable uObject at line 5 will point to the untrusted object as it holds the return value of the invocation to getSecurityObject. The value now flows from uObject to secObj1 at line 7 and then to action1.object at line 12. The method action1.invoke at line 14 results in the untrusted object being used in the call of invoke0. As there is no other value flow, the analysis can safely ignore the remaining variables. That is, the analysis indicates that variables such as tFactory (at line 4), tObject (at line 6), and action2 (at line 13) do not point to an untrusted heap object. Accordingly, the slicing module can refine the program slice by removing these variables and the allocation sites that they point to. The final program slice is shown in FIG. 3.

The final program slice is then passed again to the points-to analysis engine, which performs a context-sensitive points-to analysis to determine if the variable storedObject at line 24 can still potentially point to the new object created at line 17, in light of the context-insensitive points-to information previously obtained (and used to compute the final program slice). In this particular example, the analysis determines that the method action1.invoke at line 10 can still result in the untrusted object being used in the call of invoke0. Accordingly, in response to the points-to query, the client is informed that the final points-to set for storedObject includes untrusted objects in the UntrustedSecurityObject class created at line 17.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

Figure 4:
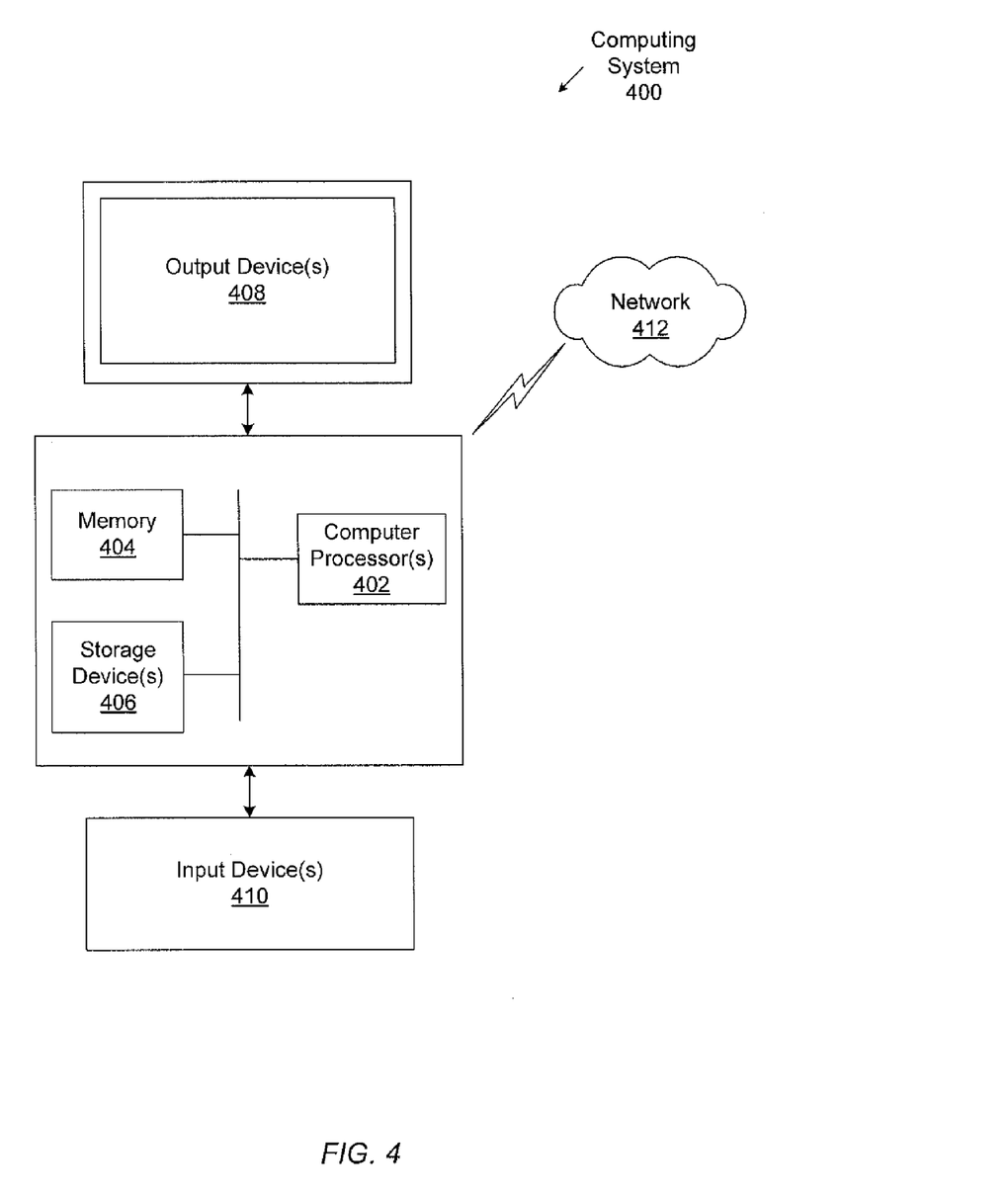
FIG. 4 shows a computing system in accordance with one or more embodiments of the invention.

For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing a staged points-to analysis of a codebase written in an object-oriented programming language, comprising:
    obtaining the codebase and a points-to query comprising a plurality of query variables in the codebase;
    slicing the codebase based on the points-to query and a plurality of slice rules to obtain a program slice;
    performing a type analysis of the program slice based on a plurality of type rules to compute a type set;
    refining the program slice, after performing the type analysis, by resolving a plurality of virtual dispatch sites based on the type set;
    performing, after refining the program slice and based on a first plurality of points-to rules, a context-insensitive and field-sensitive first points-to analysis of the program slice to compute a first points-to set;
    re-refining the program slice, after performing the first points-to analysis, by resolving the plurality of virtual dispatch sites based on the first points-to set; and
    performing, after re-refining the program slice and based on a second plurality of points-to rules, a context-sensitive second points-to analysis of the program slice to compute a second points-to set,
    wherein the second points-to set is provided to a developer.

2. The method of claim 1, further comprising:
    compacting the program slice by performing an operation selected from a group consisting of pruning redundant code and factoring out equivalent code.

3. The method of claim 2, wherein compacting the program slice comprises building a value flow graph comprising the plurality of query variables.

4. The method of claim 2, wherein compacting the program slice is performed after slicing the codebase, after refining the program slice, and after re-refining the program slice.

5. The method of claim 1,
wherein the type set comprises possible types of any object that may be referenced by the plurality of query variables, and
wherein the first points-to set comprises possible object-creation sites for any object that may be referenced by the plurality of query variables.

6. The method of claim 1, wherein resolving the plurality of virtual dispatch sites is further based on the slice rules.

7. The method of claim 1, wherein performing the first points-to analysis comprises building a heap abstraction.

8. A non-transitory computer readable medium for performing a staged points-to analysis of a codebase written in an object-oriented programming language, comprising instructions for:
obtaining the codebase and a points-to query comprising a plurality of query variables in the codebase;
slicing the codebase based on the points-to query and a plurality of slice rules to obtain a program slice;
performing a type analysis of the program slice based on a plurality of type rules to compute a type set;
refining the program slice, after performing the type analysis, by resolving a plurality of virtual dispatch sites based on the type set;
performing, after refining the program slice and based on a first plurality of points- to rules, a context-insensitive and field-sensitive first points-to analysis of the program slice to compute a first points-to set;
re-refining the program slice, after performing the first points-to analysis, by resolving the plurality of virtual dispatch sites based on the first points-to set; and
performing, after re-refining the program slice and based on a second plurality of points-to rules, a context-sensitive second points-to analysis of the program slice to compute a second points-to set, wherein the second points-to set is provided to a developer.

9. A non-transitory computer readable medium of claim 8, further comprising instructions for:
compacting the program slice by performing an operation selected from a group consisting of pruning redundant code and factoring out equivalent code.

10. A non-transitory computer readable medium of claim 9, wherein compacting the program slice comprises building a value flow graph comprising the plurality of query variables.

11. A non-transitory computer readable medium of claim 9, wherein compacting the program slice is performed after slicing the codebase, after refining the program slice, and after re-refining the program slice.

12. A non-transitory computer readable medium of claim 8, wherein the type set comprises possible types of any object that may be referenced by the plurality of query variables, and wherein the first points-to set comprises possible object-creation sites for any object that may be referenced by the plurality of query variables.

13. A non-transitory computer readable medium of claim 8, wherein resolving the plurality of virtual dispatch sites is further based on the slice rules.

14. A non-transitory computer readable medium of claim 8, wherein performing the first points-to analysis comprises building a heap abstraction.

15. A system for performing a staged points-to analysis of a codebase written in an object-oriented programming language, comprising:
an analysis repository storing the codebase, a plurality of slice rules, a plurality of type rules, a first plurality of points-to rules, a second plurality of points-to rules, and a points-to query comprising a plurality of query variables in the codebase;
a processor; and
a staged analysis platform executing on the processor and comprising:
a slicing module configured to:
slice the codebase based on the points-to query and the plurality of slice rules to obtain a program slice,
refine the program slice, after a type analysis of the program slice is performed, by resolving a plurality of virtual dispatch sites based on a type set, and
re-refine the program slice, after a first points-to analysis is performed, by resolving the plurality of virtual dispatch sites based on a first points-to set;
a type analysis engine configured to perform the type analysis of the program slice based on the plurality of type rules to compute the type set; and
a points-to analysis engine configured to:
perform, after the program slice is refined and based on the first plurality of points-to rules, the first points-to analysis of the program slice to compute the first points-to set, wherein the first points-to analysis is context-insensitive and field-sensitive, and
perform, after the program slice is re-refined and based on the second plurality of points-to rules, a context-sensitive second points-to analysis of the program slice to compute a second points-to set,
wherein the second points-to set is provided to a developer.

16. The system of claim 15, wherein the slicing module is further configured to:
compact the program slice by performing an operation selected from a group consisting of pruning redundant code and factoring out equivalent code.

17. The system of claim 16, wherein compacting the program slice comprises building a value flow graph comprising the plurality of query variables.

18. The system of claim 16, wherein the slicing module compacts the program slice after slicing the codebase, after refining the program slice, and after re-refining the program slice.

19. The system of claim 15,
wherein the type set comprises possible types of any object that may be referenced by the plurality of query variables, and
wherein the first points-to set comprises possible object-creation sites for any object that may be referenced by the plurality of query variables.

20. The system of claim 15, wherein resolving the plurality of virtual dispatch sites is further based on the slice rules.

* * * * *